United States Patent [19]

Armstrong

[11] 4,131,947
[45] Dec. 26, 1978

[54] RANDOM ACCESS DIGITAL SORTER

[76] Inventor: Philip N. Armstrong, 17331 Keegan Way, Santa Ana, Calif. 92705

[21] Appl. No.: 859,267

[22] Filed: Dec. 9, 1977

Related U.S. Application Data

[63] Continuation of Ser. No. 712,268, Aug. 6, 1976, abandoned.

[51] Int. Cl.² .............................................. G06F 7/06
[52] U.S. Cl. .................................... 364/900; 364/200
[58] Field of Search ................................ 364/200, 900

[56] References Cited

U.S. PATENT DOCUMENTS

| | | | |
|---|---|---|---|
| 2,907,003 | 9/1959 | Hobbs .............................. | 340/172.5 |
| 2,985,864 | 5/1961 | Fillebrown et al. .............. | 340/172.5 |
| 3,636,519 | 1/1978 | Heath .............................. | 340/172.5 |

*Primary Examiner*—Gareth D. Shaw
*Assistant Examiner*—C. T. Bartz
*Attorney, Agent, or Firm*—Keith D. Beecher

[57] ABSTRACT

A system is provided for sorting binary data records, which includes random access memory means for storing the data records and from which the data records may be retrieved in an ordered sequence. There is no sorting time mode within the system itself, and the system has but two modes of operation, an input mode and an output mode. The time required for sorting the data is dependent only on the rate at which the data records are fed into the system and the rate at which the data records are retrieved out of the system.

17 Claims, 10 Drawing Figures

FIG. 3 (Sorting Network) $S_i$

FIG. 1

| ADDRESS | DATA | KEY |
|---|---|---|

|  | INPUT MODE | | | |
|---|---|---|---|---|
| INPUT SEQUENCE: | 7 2 9 1 16 4 | 15 5 11 | 6 3 8 | 10 12 14 13 |
| INPUT INTERVAL: | 16 15 14 13 12 11 | 10 9 8 | 7 6 5 | 4 3 2 1 |

| INTERVAL | $R_3$ | $R_2$ | $R_1$ | $R_0$ |
|---|---|---|---|---|
| 1 |  | 7B 6B 5B 4B | 3B 2B | 1 13 |
|  | 1B 0B | 3B 2B 1B 0B | 1B 0B | 0 B |
| 2 |  | 7B 6B 5B 4B | 3B 2B | 1 14 |
|  | 1B 0B | 3B 2B 1B 0B | 1B 0B | 0 13 |
| 3 |  | 7B 6B 5B 4B | 3B 2B | 1 13 |
|  | 1B 0B | 3B 2B 1B 0B | 1B 014 | 0 12 |
| 4 |  | 7B 6B 5B 4B | 3B 2B | 1 12 |
|  | 1B 0B | 3B 2B 1B 0B | 1 13 014 | 0 10 |
| 5 |  | 7B 6B 5B 4B | 3B 2 14 | 1 10 |
|  | 1B 0B | 3B 2B 1B 0B | 1 13 0 B | 0 8 |
| 6 |  | 7B 6B 5B 4B | 3 13 2 14 | 1 8 |
|  | 1B 0B | 3B 2B 1B 0B | 1 10 012 | 0 3 |
| 7 |  | 7B 6B 5B 4B | 3 13 2 12 | 1 6 |
|  | 1B 0B | 3B 2B 1B 014 | 1 10 0 8 | 0 3 |
| 8 |  | 7B 6B 5B 4B | 3 11 2 12 | 1 6 |
|  | 1B 0B | 3B 2B 1 13 014 | 1 10 0 8 | 0 3 |
| 9 |  | 7B 6B 5B 4B | 3 11 2 8 | 1 5 |
|  | 1B 0B | 3B 2 12 1 13 014 | 1 10 0 6 | 0 3 |
| 10 |  | 7B 6B 5B 4B | 3 11 2 8 | 1 5 |
|  | 1B 0B | 3 15 2 12 1 13 014 | 1 10 0 6 | 0 3 |
| 11 |  | 7B 6B 5B 4 14 | 3 11 2 6 | 1 4 |
|  | 1B 0B | 3 15 2 12 1 13 0 8 | 1 10 0 5 | 0 3 |
| 12 |  | 7B 6B 5 16 4 13 | 3 11 2 6 | 1 4 |
|  | 1B 0B | 3 15 2 12 1 13 0 8 | 1 10 0 5 | 0 3 |
| 13 |  | 7B 6B 5 16 4 14 | 3 11 2 5 | 1 3 |
|  | 1B 0B | 3 15 2 12 1 13 0 8 | 1 10 0 4 | 0 1 |
| 14 |  | 7B 6 12 5 16 4 14 | 3 10 2 5 | 1 3 |
|  | 1B 0B | 3 15 2 6 1 13 0 8 | 1 9 0 4 | 0 1 |
| 15 |  | 7 15 6 12 5 16 4 14 | 3 10 2 4 | 1 2 |
|  | 1B 014 | 3 11 2 6 1 13 0 8 | 1 9 0 3 | 0 1 |
| 16 |  | 7 15 6 12 5 13 4 8 | 3 9 2 4 | 1 2 |
|  | 1 16 014 | 3 11 2 6 1 10 0 5 | 1 7 0 3 | 0 1 |

FIG. 8

OUTPUT MODE

| INTERVAL | $R_3$ | | $R_2$ | | | | | | | | $R_1$ | | | | $R_0$ | |
|---|---|---|---|---|---|---|---|---|---|---|---|---|---|---|---|---|
|  |  | B | B | 7 | 15 6 | 12 5 | 13 4 | 8 |  |  | 3 | 9 | 2 4 |  | 1 | 2 |
| 1 | 1 | 16 O | 14 | 3 | 11 2 | 6 1 | 10 O | 5 |  |  | 1 | 7 | 0 3 |  | 0 | 1 |
|  |  | B | B | 7 | 15 6 | 12 5 | 13 O | 14 |  |  | 3 | 9 | 0 5 |  | 0 | 3 |
| 2 | 1 | 16 | B | 3 | 11 2 | 6 1 | 10 4 | 8 |  |  | 1 | 7 | 2 4 |  | 1 | 2 |
|  |  | B | B | 7 | 15 6 | 12 5 | 13 O | B |  |  | 3 | 9 | 0 8 |  | 0 | 4 |
| 3 | 1 | 16 | B | 3 | 11 2 | 6 1 | 10 O | 14 |  |  | 1 | 7 | 0 5 |  | 0 | 3 |
|  |  | B | B | 7 | 15 4 | B 5 | 13 O | B |  |  | 3 | 9 | 0 8 |  | 1 | 6 |
| 4 | 1 | 16 | B | 3 | 11 6 | 12 1 | 10 O | 14 |  |  | 1 | 7 | 0 5 |  | 0 | 4 |
|  |  | B | B | 7 | 15 4 | B 1 | B O | B |  |  | 3 | 9 | 2 12 |  | 1 | 6 |
| 5 | 1 | 16 | B | 3 | 11 6 | 12 5 | 13 O | 14 |  |  | 1 | 7 | 0 8 |  | 0 | 5 |
|  |  | B | B | 7 | 15 4 | B 5 | 13 O | B |  |  | 3 | 9 | 0 14 |  | 0 | 8 |
| 6 | 1 | 16 | B | 3 | 11 2 | B 1 | 10 6 | B |  |  | 1 | 7 | 2 12 |  | 1 | 6 |
|  |  | B | B | 7 | 15 4 | B 5 | 13 O | B |  |  | 3 | 9 | 0 B |  | 0 | 12 |
| 7 | 1 | 16 | B | 3 | 11 2 | B 1 | 10 6 | B |  |  | 1 | 7 | 0 14 |  | 0 | 8 |
|  |  | B | B | 7 | 15 4 | B 5 | 13 O | B |  |  | 2 | B | 0 B |  | 0 | 12 |
| 8 | 1 | 16 | B | 3 | 11 2 | B 1 | 10 6 | B |  |  | 3 | 9 | 0 14 |  | 0 | 8 |
|  |  | B | B | 7 | 15 4 | B 2 | B O | B |  |  | 2 | B | 0 B |  | 0 | 12 |
| 9 | 1 | 16 | B | 3 | 11 2 | B 5 | 13 6 | B |  |  | 1 | 10 | 0 14 |  | 1 | 9 |
| 10 |  | B | B | 1 | 16 4 | B 2 | B O | B |  |  | 2 | B | 0 B |  | 0 | 12 |
|  |  | B | B | 7 | 15 2 | B 5 | 13 6 | B |  |  | 1 | 10 | 0 14 |  | 0 | 11 |
| 11 |  |  |  | 1 | B 4 | B 2 | B O | B |  |  | 2 | B | 0 B |  | 0 | 12 |
|  |  |  |  | 1 | 16 2 | B 5 | 13 6 | B |  |  | 3 | 15 | 0 14 |  | 0 | 11 |
| 12 |  |  |  | 1 | B 4 | B 2 | B O | B |  |  | 2 | B | 0 B |  | 1 | 13 |
|  |  |  |  | 1 | 16 2 | B 7 | B 6 | B |  |  | 3 | 15 | 0 14 |  | 0 | 12 |
| 13 |  |  |  |  | B | B | B | B |  |  | 2 | B | 0 B |  | 1 | 15 |
|  |  |  |  | 1 | 16 | B | B | B |  |  | 1 | B | 0 14 |  | 1 | 13 |

FIG. 9

FIG. 11 (OUTPUT MODE)

FIG. 10 (INPUT MODE)

RANDOM ACCESS DIGITAL SORTER

This application is a continuation of Copending Application Ser. No. 712,268, filed Aug. 6, 1976, now abandoned.

BACKGROUND OF THE INVENTION

Sorting is generally acknowledged to be one of the most extensive computations for which computers are used. The number of papers and books which have been published in recent years on the subject is a clear attestation of that fact. For example, in the Art of Computer Programming, Knuth, Volume III, Page 3, it is stated that computer manufacturers estimate that over twenty-five percent of the running time on their computers is spent in sorting. A reason for this is that rearrangement of data within conventional computers is an essentially cumbersome task because conventional computers are generally limited to performing complicated permutations by sequences of transpositions of data.

Sorting systems are known in the prior art, however, which are capable of responding to a series of binary data records, and which are capable of sorting the records into an ascending or descending sequence as determined by an identifying key assigned to each record. Systems of this general type are described, for example, in U.S. Pat. Nos. 3,329,939 and 3,399,383 which issued in the name of the present inventor. The sorting systems described in these patents are capable of rearranging the data records into a desired sequence, and they are intended to be used in conjunction with general purpose computers.

A primary objective of the present invention is to provide a sorting system which is capable of rearranging the data records in a more rapid and more economical basis than the prior art sorting systems, and on a much more rapid and much more economical basis than the general purpose computers themselves. Specifically, the sorting system of the present invention is intended to relieve the general purpose computer of one of its most frequent and time consuming operations.

It is well known that to sort n records by comparisons requires on the order of n $\log_2$ n comparisons. It is an objective of the system of the present invention to make on the order of $\log_2$ n of these comparisons concurrently in each unit of time, thereby reducing the time requirements to the order of n, as compared with the prior art systems. In addition, the system of the invention serves to incorporate this algorithm into a standard random-access memory system with a minimal increment in complexity and cost.

The data records which are sorted in the system of the invention are multi-bit binary records, each of which includes a first portion representing the key which identifies the record and which is read first in a serial machine, a data portion which is read next, and an address portion which is read last. A sort is accomplished in the system of the invention when the identifying keys of a series of data records read out of the system represent a monotonic sequence of numbers, which may be increasing or decreasing, and which are increasing in the embodiment to be described. Although the records must be of equal length for any particular sort operation, the system itself is capable of handling records of different lengths up to the capabilities of its individual memory cells.

The sorting system of the invention has but two modes of operation, an input mode and an output mode, as mentioned above. During the input mode the system accepts records serially in a random sequence insofar as their identifying keys are concerned, and it stores the records in its random access memory. During the output mode, the records are retrieved from the random access memory on an instantaneous basis, and are produced serially in a sorted sequence insofar as their identifying keys are concerned. As stated above, the actual sorting of the records in the system is achieved immediately, and the only delays encountered are the times required to feed the records into the system during the input mode, and to retrieve the records out of the system during the output mode.

In explaining the algorithm involved in the sorting system of the invention, it may be assumed that the data records are arranged into k levels, and that each record in each level, except those in the highest level, specifies a pair of records in the next higher level.

In operation of the system when a record is passed to the system it first passes to a comparator at the lowest level. The record which is the largest of the input record and the records in the lowest level with which it is compared is then passed to a comparator at the next higher level. Generally when a record is passed to a level k it will be compared with records at that level and the largest of the records with which it is compared and the record itself will be displaced to the next higher level k+1. Records which are not displaced but which are subject to comparison at a level k will be retained for storage at that level k.

If a record is displaced from a level k to a level k+1, it will clearly be preceded by the records with which it was compared in level k. Thus a record in level k may have appended to it the address in level K+1 at which may be found a record which succeeds it in the sorted sequence.

When all of the records have been placed in the store which are to be sorted, they may be withdrawn in an ordered sequence. A blank record may be transmitted to the highest level, thus displacing a data record or a blank to the next lower level, which in turn will displace a record or blank until finally a record is displaced from the lowest level. When a record is displaced from a level, the address of the first record of the collection of records which succeed it in the next higher level is transmitted to that higher level and the address which contained the record is appended to it as it passes to the next lower level. During this part of the procedure, a record greater than a record with which it is compared will displace the smaller record from a module.

In practice, the sets of records to be compared at each level are kept to a total of three records, including the one shifted from the previous level. This is achieved by arranging the records in pairs so that the lower level contains one pair, the second level from the lower level contains two pairs, and in general the nth level from the lower level contains $2^{n-1}$ pairs. Therefore, in k levels, $2^{k+1}-2$ records may be stored. Each record in a given level serves to specify exactly one of the pairs in the next higher level, and at each stage of the operation at most one pair in each level lacks such a predecessor.

It should be understood that in place of pairs of records, a machine may be constructed to accommodate clusters of many records. In such a machine, each record R contained in a random access store at level k would contain the address of the least record, or first record, of a cluster C in the random access store at level k+1 — if level k is not the highest level. Each member of the cluster C would follow the record R in the final output sorted sequence.

As used here, a cluster would then be a collection of records, the first or least of which is an identified address. Again, the least record in a collection will be the first record of that collection in the sorted sequence.

During the input mode, each record will specify the corresponding pair at the next higher level. That is, the jth record at one level will specify the jth pair at the next higher level. A selection of records from each level is said to be a chain, if for each record in the chain, the record from the next higher level that is in the chain is in its designated pair. Just prior to the input operation, the system is filled with unity blanks whose indices have the highest possible values (all 1's). The system is filled in such a way that each record precedes the members of the pair that it specifies.

Whenever a new record of a chain is entered into the system during the input operation, it is compared with the members of the chain already in the system, beginning at the lowest level and working up until the one it follows is found. The succeeding members in the chain are moved up the chain one-by-one, and the last one is moved out of the system. During each input interval during which a new record is shifted into the system, a zero blank (all 0's) is also shifted into the system. During the input operation, the records so moved out of the system will be the zero blanks referred to above, together with the blanks (all 1's) which are displaced by data records.

During the output operation, there is no need to wait until the first record has been extracted to begin comparisons for the second record. In fact, as soon as a record is shifted from the third to the second level, it will be known that the records in the third level are without a specified predecessor, that is those specified by the shifted record, and comparisons can begin to be made at the third level again. In general, as soon as the comparisons at the nth level for the jth cycle are completed, the comparisons at the $(n+1)$ level for the $(j+1)$ cycle can begin. Since these comparisons are accomplished serially on a bit-by-bit basis, comparisons can begin again at the nth level as soon as the first character of the record shifted from the level $n+1$ is received.

A mechanism is provided in the system of the invention for addressing the individual banks of random access memory. As noted previously, the records to be compared at a given level are the record being shifted from the next lower level, and the pair that was just left without a specified predecessor because of the shifting of a record out of the level below. The last character of each record will represent a starting address of the pair it specifies. As a record is shifted from one level to the next this address is transmitted to the address register of the module above, and it is replaced with the current starting address from the current level. Upon receiving this address the memory module performs a read followed by a write beginning at this address for a number of loations determined by the record length.

DETAILED DESCRIPTION OF THE ILLUSTRATED EMBODIMENTS

As explained above, the random access sorting system of the invention is designed to manipulate records so that they may be derived from the system in an ordered sequence, the rearrangement of the records within the sorting system being achieved without any delay, and the time required for sorting being solely dependent on the rate at which the data records may be introduced into and derived from the system. The records processed by the sorting system of the invention for any particular sorting operation are assumed to be multi-bit binary words of equal length. It is also assumed that the data is processed serially bit-by-bit within the system, although it will become obvious as the description proceeds, that the system could be designed for parallel operation.

Figures 1, 2, 3:
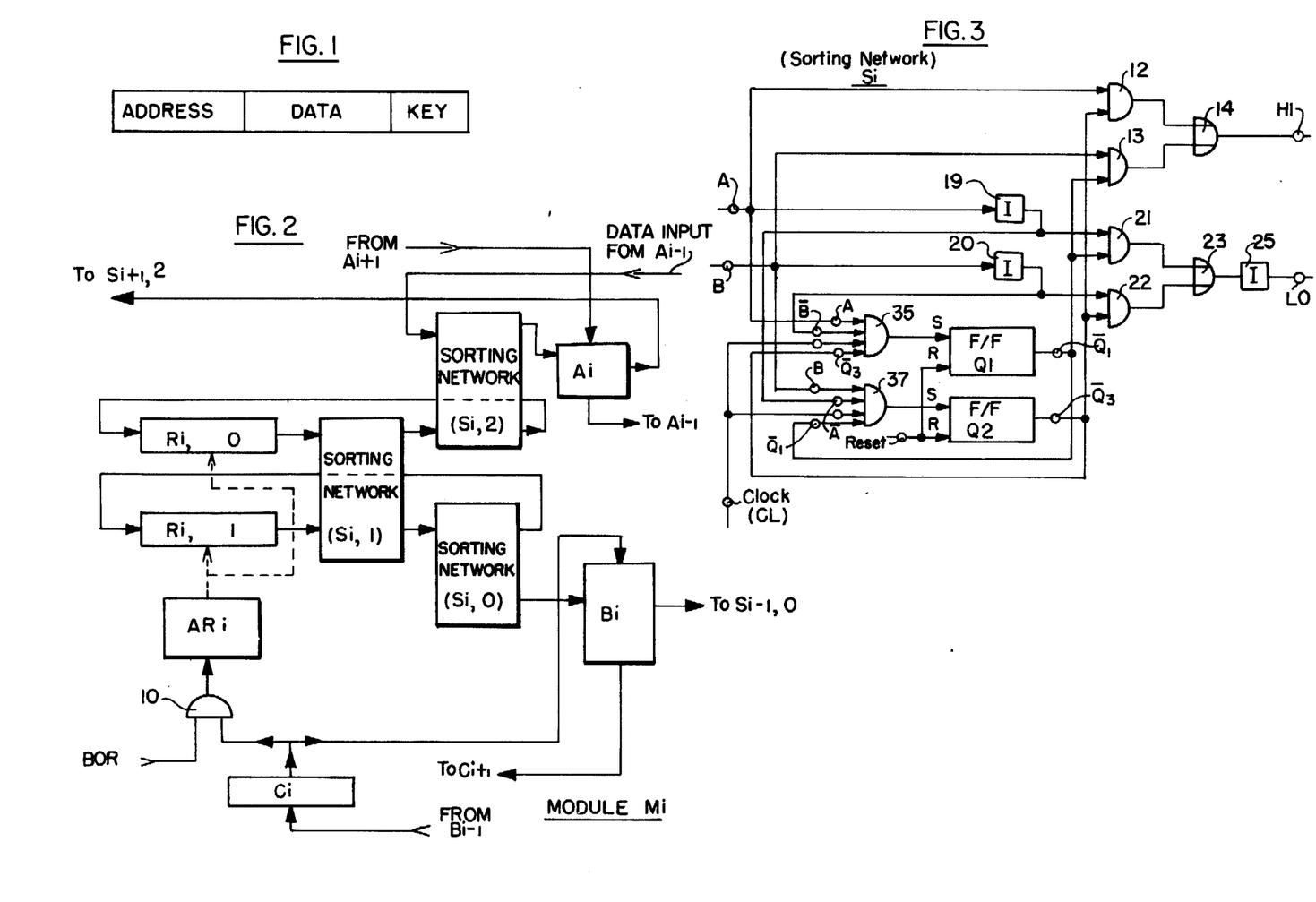
FIG. 1 is a representation of one of the multiplicity of records which may be sorted by the apparatus and system of the invention.
FIG. 2 is a block representation of a basic module, the sorting system of the invention being formed of a multiplicity of such modules.
FIG. 3 is a logic diagram of a sorting network which is used in the module of FIG. 2.

As stated above, the random access sorting system is constructed to process records of equal length, each containing a predetermined number of bits, which number may be changed from one sort operation to another. The records may have a format such as shown in FIG. 1, with selected number of bits at the forward end of the record constituting the key on which the sort is predicated, and which is read first. The key is then followed by the data portion which comprises another selected number of bits, and each record has a mult-bit address portion at the end of the record. The bits of the key must be in decreasing order of significance from right to left in FIG. 1, so that two records may be properly ordered by detecting the first inequality of corresponding bits as the records are simultaneously scanned, beginning with the most significant bit positions, at the right in FIG. 1.

In the operation of the system, the records may be fed into the random access sorter for storage, and they may be subsequently withdrawn in an ordered sequence of keys. In the following description, it will be presumed for convenience of explanation that the first record derived from the system during the output operation will be the one with the lowest key, and this record will be followed by subsequent records of increasing keys in an ordered sequence. It will become clear as the description proceeds, that such an increasing sequence of keys may be obtained, or, if desired, a decreasing sequence of keys may be obtained, depending upon the control exerted on the random access sorter.

In the operation of the system, the random access sorter is first filled with unity blanks. Unity blanks are defined, for the purpose of the ensuing description, as records whose keys are all 1's and therefore are larger than the keys of any of the data records to be processed in the system. As the data records are fed into the random access sorting system of the invention, a corresponding number of unity blanks are displaced from the system. Zero blanks, whose keys are all 0's and therefore are smaller than the keys of any of the data records, are also fed into the system during the input mode to prevent data records from being displaced out of the system. When all the records to be sorted have been introduced into the system, and have been placed in its memory, the output operation may begin. During the output operation, unity blanks are introduced into the system to displace the data records, which are outputted from the system in an ordered sequence.

The random access sorting system of the invention is made up of a plurality of modules, such as the module designated $M_i$ in FIG. 2. The module $M_i$ is composed of two random access memory registers designated $R_i,0$ and $R_i,1$. Each of the memory registers has a predetermined number of memory cells, which varies from module-to-module, in a progression $2^0, 2^1, 2^2, 2^4 \ldots$, as will be described. It will become evident, however, as the description proceeds that a more rapid progression may be implemented, if so desired. The registers $R_i,0$ and $R_i,1$ are respectively connected to a sorting network designated $S_i,1$ which, in turn, is connected to a pair of like sorting networks $S_i,0$ and $S_i,2$. The sorting network $S_i,2$ has a first output connected to a logic circuit $A_i$, and the sorting network $S_i,0$ has a first output connected to a logic circuit designated $B_i$. A second output of sorting network $S_i,2$ is connected back to the input of register $R_i,0$, and a second output of sorting network $S_i,0$ is connected back to the input of register $R_i,1$. The output of circuit $B_i$ is connected to one of the input terminals of a sorting network $S_{i-1},0$ of the preceding module.

The random access memory registers $R_i,0$ and $R_i,1$ are addressed by an address register $AR_i$. During the input operation, the address register $AR_i$ is controlled so that it selects each pair of memory cells from the registers $R_i,0$ and $R_i,1$ in a sequence during successive record times, so that the contents of the selected pairs of memory cells may be introduced to sorting network $S_i,1$. The sequence is then repeated in cyclic manner for the duration of the input operation.

During the output operation the address register $AR_i$ is controlled by a further address register $C_i$. The address portion of a selected record in the preceding module is placed in the address register $C_i$ during each operational interval of the output operation, and the address is then placed at the proper time in the address register $AR_i$ through "and" gate 10, as the "and" gate is enabled by the term BOR which represents the time the next record to be processed reaches the logic circuit $A_i$. Therefore, during the output operation, and as will be described in more detail subsequently, the pairs of memory cells of the random access memory registers $R_i,0$ and $R_i,1$ are addressed under the control of selected words in the previous module.

The data from the preceding module is fed to one of the input terminals of sorting network $S_i,2$. The output of logic network $A_i$ is connected to an input terminal of sorting network $S_{i+1},2$ of the next module. The logic circuit $A_i$ is also controlled by the output of logic circuit $A_{i+1}$ of the next module, and it in turn controls the logic circuit $A_{i-1}$ of the preceding module.

Likewise, an output terminal of sorting network $S_i,0$ is connected to a logic network $B_i$ which supplies the required address to the address register $C_{i+1}$ of the next module, and which also introduces an output to an input of the sorting network $S_{i-1},0$ of the preceding stage.

The sorting networks $S_0$, $S_1$ and $S_2$ are identical. Each of the sorting networks, as shown in FIG. 2, is equipped with two input lines and two output lines. Successive bits from corresponding positions of two records will pass simultaneously through each of the sort circuits. The sorting networks include circuitry for comparing the input bits. Until unequal bits are encountered, the same data applied to the input lines of each sort circuit will appear at the corresponding output lines. When the first inequality of corresponding bits is encountered, the record with the greater key will be identified and the data from the two input lines will then be guided to the two output lines so that the record with the greater key will appear on the upper output line and the record with the smaller key will appear at the lower output line.

Each of the sorting networks may be a circuit such as described in U.S. Pat. No. 3,399,383, and which is shown in FIG. 3. The sorting network of FIG. 3 includes a first input terminal A which receives, for example, a first record, and it includes a second input terminal B which receives a second record. The input terminal A is connected to an "and" gate 12 and to an inverter network 19. The input terminal B is connected to an "and" gate 13 and to an inverter network 20. The inverter network 19 responds in known manner to the input record A to produce its complement $\overline{A}$ on a bit-by-bit basis; and the inverter network 20 responds to the record B to produce its complement $\overline{B}$ on a bit-by-bit basis.

The inverter network 19 is connected to an "and" gate 21, and the inverter network 20 is connected to an "and" gate 22. The "and" gates 12 and 13 are connected to an "or" gate 14. The "or" gate 14 is connected to the output terminal designated "HI". The "and" gates 21 and 22 are connected to an "or" gate 23. The "or" gate 23 is connected to an inverter network 25 which, in turn, is connected to the "LO" terminal.

The input terminal A and the output terminal of the inverter 20 are connected to an "and" gate 35. This means that the binary coded records A and $\overline{B}$ are introduced to the "and" gate 35. The input terminal B and the output of inverter 19 are connected to an "and" gate 37. Therefore, the binary coded records B and $\overline{A}$ are applied to the "and" gate 37. Appropriate bit timing clock pulses are also applied to the "and" gates 35 and 37 for timing purposes. The "and" gate 35 is connected to the set input terminal of an inhibit flip-flop Q1. The "and" gate 37 is connected to the set input terminal of an exchange flip-flop Q3. Prior to each input operation, reset pulses are applied to the reset input terminals of the flip-flops Q1, Q3 to reset the flip-flops.

The reset output terminal $\overline{Q1}$ of the inhibit flip-flop Q1 is connected to the "and" gates 13 and 21, and also to the "and" gate 37. This reset output terminal $\overline{Q1}$ of the flip-flop applies the term $\overline{Q1}$ to the "and" gates 13, 21 and 37 when the flip-flop is set. The reset output terminal $\overline{Q3}$ of the exchange flip-flop Q3 is connected to "and" gates 12, 22 and 35. This latter output terminal of the exchange flip-flop applies the term $\overline{Q3}$ to the "and" gates 12, 22 and 35 when the flip-flop is set.

As noted above, the random access sorting system of the invention, in the embodiment under consideration, is a serial type in which the records A and B are processed in the sorting system in a bit-by-bit serial manner, with the most significant bit of the key of each record in the lead. At the commencement of the sorting operation, both the inhibit flip-flop Q1 and the exchange flip-flop Q3 in the circuit of FIG. 3 are reset, so that both the terms $\overline{Q1}$ and $\overline{Q3}$ are true.

Therefore, at the beginning of the operation, the "and" gates 12, 13, 21 and 22 are all enabled. The records A and B pass through the "and" gates on a serial bit-by-bit basis so long as the corresponding bits of the two records are both either "1" or "0". These bits then appear unchanged, at the output terminals "HI" and "LO".

Assume that a bit in the key of the record A is "0" at the time when the corresponding bit in the key of the record B is a "1", and that this is the first instance that a condition of one record having a bit different than the corresponding bit of the other record has occurred, this means that the key of record B represents a higher integer than the key of record A. Under these conditions, the term $\overline{A} \cdot B$ is true, so that the "and" gate 37 is enabled. The next clock pulse sets the exchange flip-flop Q3, so that the "and" gates 12 and 22 are disabled. Also, the "and" gate 35 is disabled, so that no further triggering of either of the flip-flops Q1 or Q3 is possible during the particular comparison operation.

Following the detection of a "0" bit in the key of the A record, and the simultaneous detection of a "1" bit in the key of the B record, indicating that the B record is greater than the A record, the remaining bits of the A record pass through the enabled "and" gate 22 in complemented ($\overline{A}$) form and through the "or" gate 23 and inverter 25 to appear reinverted (A) at the output terminal "LO".

At the same time, the remaining bits of the B record pass through the enabled "and" gates 13 and 14 to the output terminal "HI". Therefore, the detection of inequality between the keys of the A and B records causes the lower A record to appear at the output terminal "LO" and the higher B record to appear at the output terminal "HI".

Conversely, should the comparison described above reach a point at which the key of the A record has a "1" bit at the time when the key of the B record has a "0" bit, indicating that the A record is greater than the B record, the term $A \cdot \overline{B}$ is applied to "and" gate 35 to enable the "and" gate so that the next clock pulse sets the inhibit flip-flop Q1. This setting of the inhibit flip-flop Q1 causes "and" gates 13 and 21 to become disabled and also causes "and" gate 37 to become disabled. The disabling of "and" gate 37 prevents any setting of the exchange flip-flop Q3 during the remaining portion of the comparison process for the particular records under consideration.

Under the latter set of conditions, the greater record A is passed through "and" gate 12 and through "or" gate 14 to the "HI" output terminal; whereas the lower record B is passed through inverter 20, through "and" gate 22, and through "or" gate 23 and inverter 25 to the "LO" output terminal, where it appears in its original form.

The logic circuit $A_i$ in each module serves to transfer the address portion of each record which passes through it to the record which is passed through the logic circuit $A_{i-1}$ of the preceding module. The logic circuit $A_i$ may take the form shown in FIG. 4. The circuit includes a flip-flop A. Flip-flop A is set by a term $t_A$ which represents the time at which the address part of each record reaches the logic circuit $A_i$ and the flip-flop is reset by a term BOR which represents the time at which each subsequent record reaches the logic circuit $A_i$. The set output terminal A of flip-flop A is connected to an "and" gate 50, a term representing the input mode is also connected to the "and" gate, and the output from the sorting network $S_i,2$ is also applied to the "and" gate.

Figure 4:
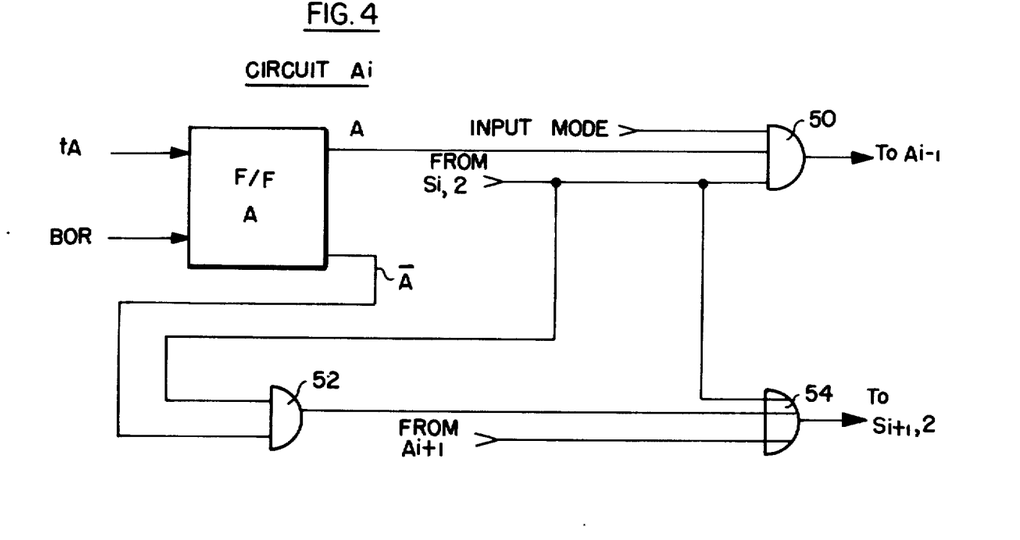
FIG. 4 is a logic diagram of a further circuit which is used in the module of FIG. 2.

The reset output terminal of flip-flop A is connected to an "and" gate 52, as is the output from the sorting network $S_i,2$. The output of "and" gate 52 is connected to an "or" gate 54, as is the output of an "and" gate corresponding to "and" gate 50 in the logic circuit $A_{i+1}$ in the next module, as well as the output from the sorting network $S_i,2$. The output of "and" gate 50 is connected to an "or" gate, corresponding to "or" gate 54 in the logic circuit $A_{i-1}$ in the preceding module, and the output of "or" gate 54 is connected to the input of the sorting network $S_{i+1},2$ in the subsequent module.

Therefore, during the input mode, the "and" gate 50 is enabled during the address portion of the record from the sorting network $S_i,2$ so that the address of the particular record is passed on to the corresponding logic network $A_{i-1}$ in the preceding module, where it constitutes the address of the record being passed through the logic network $A_{i-1}$.

During the remaining part of the record, the term $\overline{A}$ is true, enabling the "and" gate 52, so that the key and data portions of the record from the sorting network $S_i,2$ are passed through the "or" gate 54 to the sorting network $S_{i+1},2$ in the next module, and the address from the record passed through the logic network $A_{i+1}$ in the next module is transferred to the record passed through "or" gate 54. Therefore, the logic networks $A_i$ during the input mode serve to transfer the addresses of each record passed through a particular logic network to the address of the record being passed through the same logic network in the preceding module. The $A_i$ circuits are in operation only during the input mode.

Figure 5:
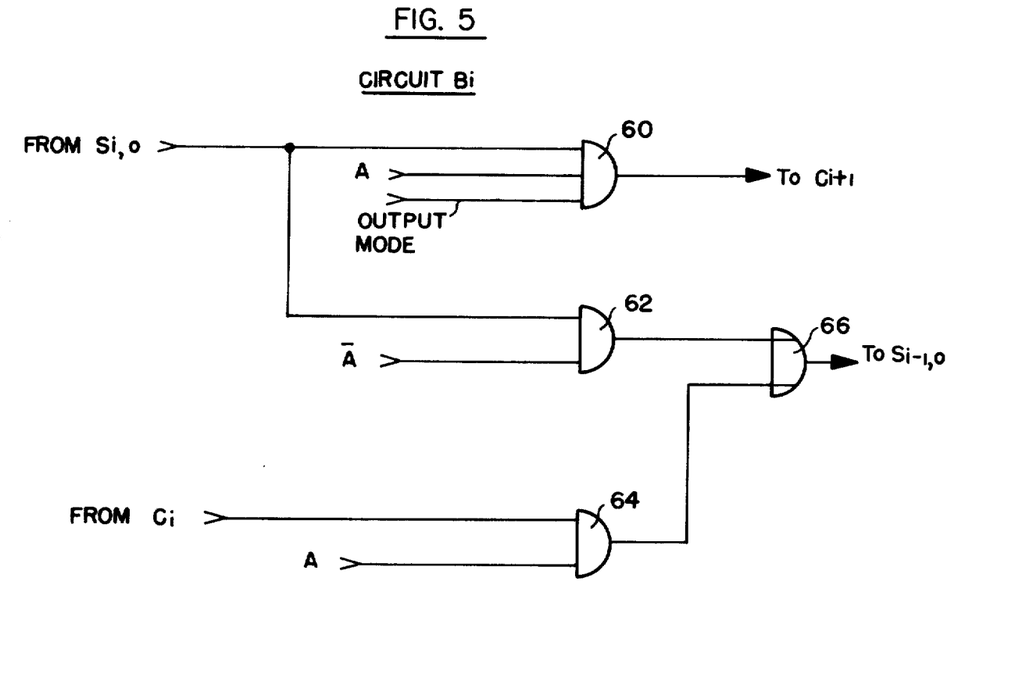
FIG. 5 is a logic diagram of yet another circuit which is used in the module of FIG. 2.

The $B_i$ logic circuits are similar in function to the $A_i$ circuits, and are in operation during the output mode. As shown in FIG. 5, the $B_i$ circuit includes three "and" gates 60, 62, 64. The output from sorting networks $S_i,0$ is passed to "and" gate 60. The set output terminal of flip-flop A is also connected to "and" gate 60, as is a term designating that the system is in the output mode.

The output from the sorting network $S_i,0$ is introduced to "and" gate 62, as is the $\overline{A}$ output of flip-flop A. The output from register $C_i$ is applied to "and" gate 64, as is the output A from flip-flop A. The output of "and" gate 60 is applied to register $C_{i+1}$ in the next module. The outputs of "and" gates 62 and 64 are applied to "or" gate 66 which, in turn, is connected to the sorting network $S_{i-1},0$ in the preceding module.

By the circuit of FIG. 5, the address portion of the record from sorting network $S_i,0$ is passed to the register $C_{i+1}$ during the output mode. The remaining part of the record from the sorting network $S_i,0$ is applied through "and" gate 62 and "or" gate 66 to the sorting network $S_{i-1},0$ in the preceding module, and the address in register $C_j$ is applied to that record through "and" gate 64 and "or" gate 66.

As explained above, the contents of the register $C_j$ will designate the pair of memory cells register $R_i,0$ or $R_i,1$ whose contents are two inputs of the sorting network $S_i,1$ to which they are attached. The outputs of network $S_i,1$, as shown in FIG. 2, are applied to the sorting networks $S_i,0$ and $S_i,2$, so that data from the addressed cells of the random access memory registers will pass through the latter two sorting networks.

The upper output of the sorting network $S_i,0$ will then pass back to the addressed memory cell of register $R_i,1$, and the lower output of sorting network $S_i,2$ will similarly pass back to the addressed memory cell of register $R_i,2$.

As will be described in conjunction with the system of FIG. 6, and as explained above, the registers $R_i,0$ and $R_i,1$ have different numbers of memory cells from module-to-module. For example, in module $M_0$ in FIG. 6, the registers $R_0,0$ and $R_0,1$ each has one memory cell ($2^0$). The module registers $R_1,0,1$ and $R_1,2,3$ in module $M_1$ each store two records ($2^1$); in the module $M_2$, the registers $R_2,0,1,2,3$ and $R_2,4,5,6,7$ each store four records ($2^2$), and the registers $R_3,0 \ldots 7$ and $R_3,8 \ldots 15$ in module $M_3$ each store eight records ($2^3$).

The two registers $AR_i$ and $C_j$ control the registers $R_i,1$ and $R_i,2$, during the output mode, as explained above. The register $C_j$ contains the address of the next pair of records to be read from each of the two registers $R_i,1$ and $R_i,2$. Register $C_j$ is set so that at the beginning of a record time its contents will be available for addressing a particular pair of memory cells in registers $R_i,1$ and $R_i,2$. As stated, the register $C_j$ is used only when data is being removed from the random access sorter during the output operation. During that mode, register $C_j$ will be set by the circuit $B_{j-1}$, as stated above. At the beginning of the output mode, all of the registers $C_j$ will be set to zero, so that each register $R_i,1$ and $R_i,2$ will be set to its first address. During the input mode, as explained above, the register $AR_i$ sequentially and cyclically addresses each pair of memory cells in registers $R_i,0$ and $R_i,1$.

Figure 6:
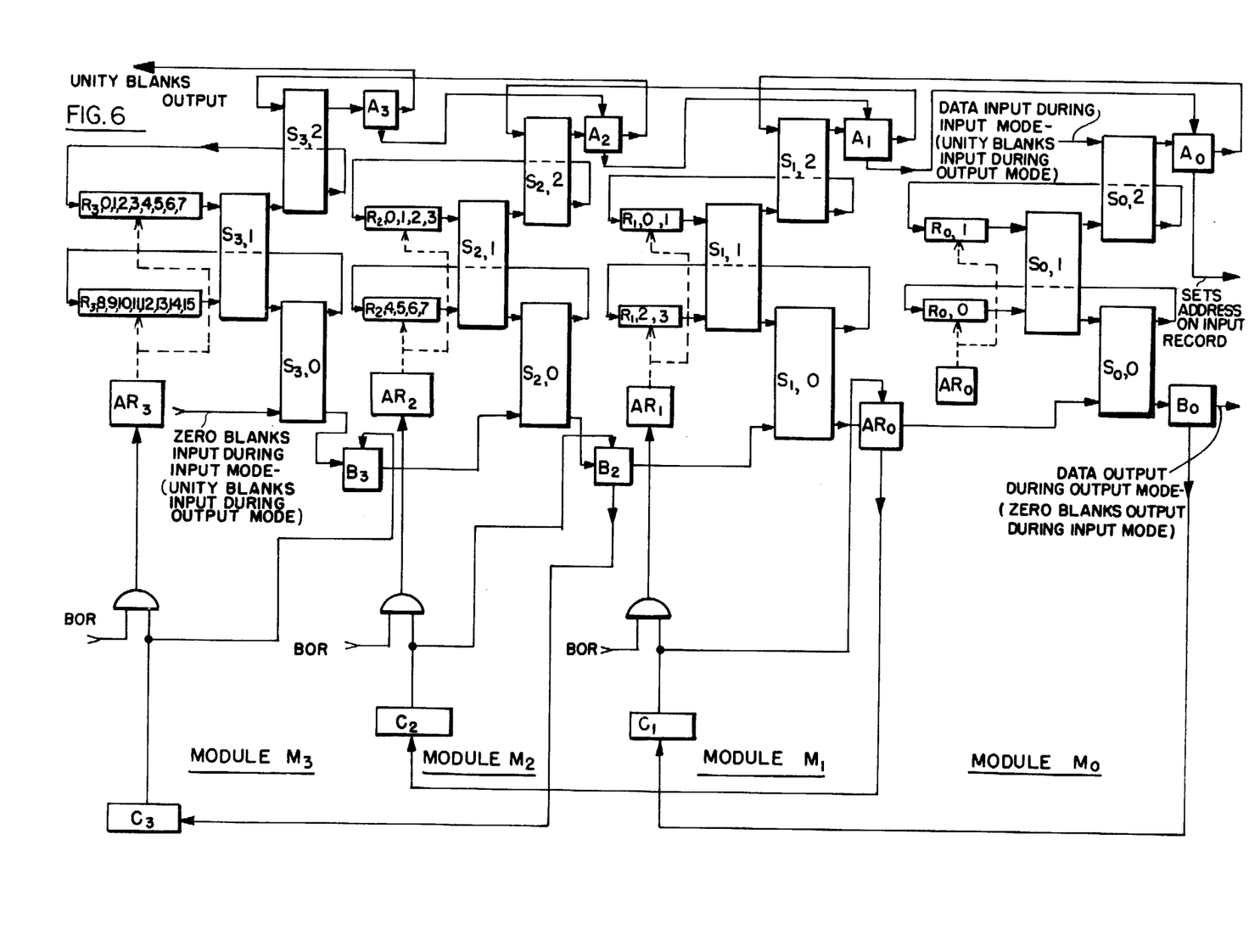
FIG. 6 is a block diagram of a four-stage sorting system which incorporates four of the modules of FIG. 2 interconnected in the illustrated manner.

As stated above, the system of FIG. 6 represents a four module random access sorting system, constructed in accordance with the invention. In the operation of the system of FIG. 6, the system is first loaded with unity blanks (1's), as mentioned above. Then, during an input mode, data is introduced into the system on the data input line shown connected to the upper input terminal of the sorting network $S_0,2$; and blanks (0's) are introduced to the lower input terminal of sorting network $S_3,0$ to prevent records from being displaced out of the system on the lower output line of sorting network $S_0,0$ during the input mode. Instead, each zero blank introduced is displaced out that line during the input mode.

Figure 7:
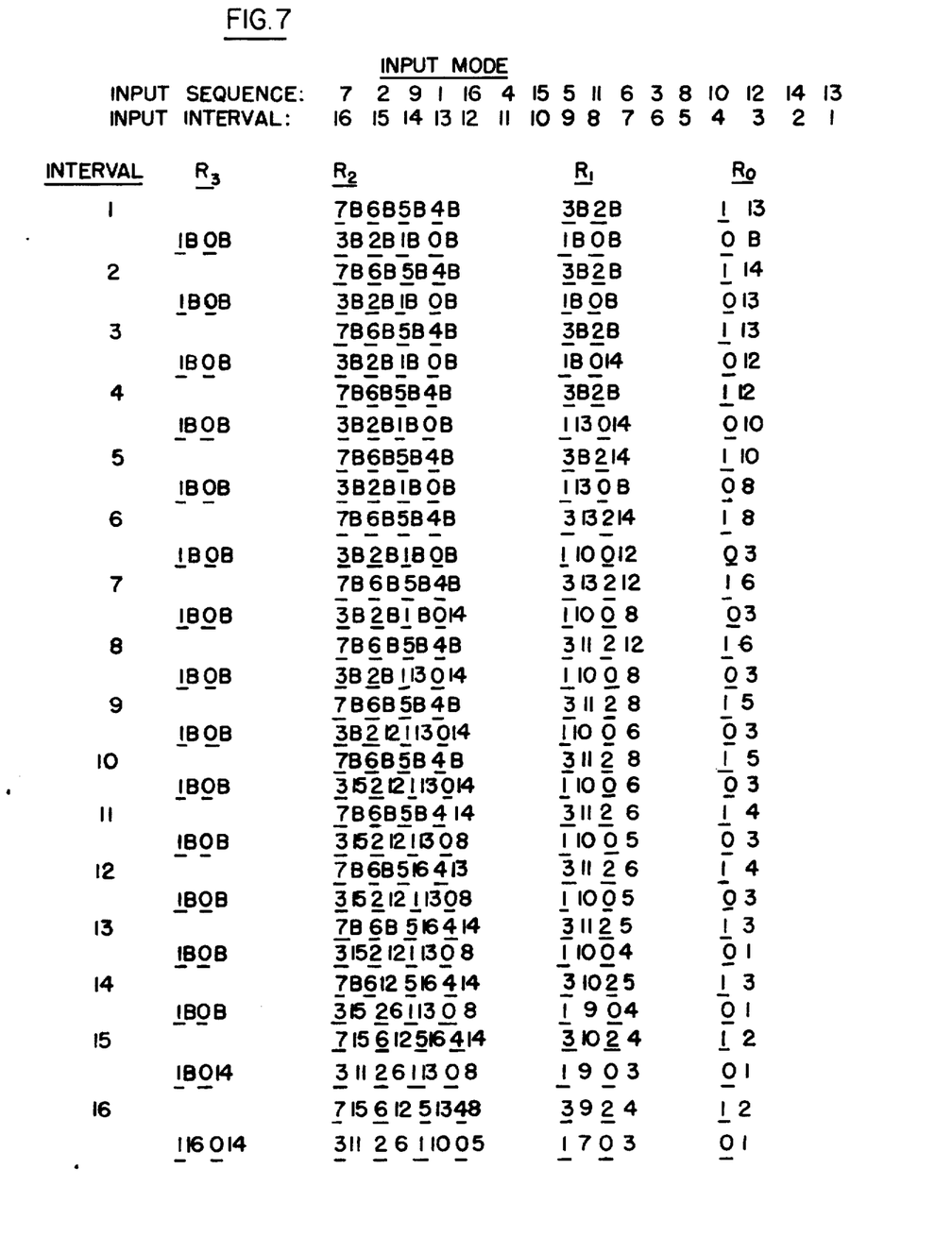
FIG. 7 is a table showing the manner in which data records are stored in the system of FIG. 6 during an input mode.

As shown in FIG. 7, it is assumed for the purpose of explaining the operation of the system, that sixteen data records are fed into the system in sixteen successive intervals, the keys of the successive records representing, for example, the integers shown at the top of FIG. 7. During the first interval, and as shown in FIG. 7, the data record 13 is shifted to the lower output terminal of sorting network $S_0,2$, and is introduced to the 1 address location of the random access memory $R_0$. During this interval, the 0 address location of memory $R_0$ is occupied by a unity blank, as are all of the memory locations in random access memories $R_1$, $R_2$ and $R_3$.

During the second interval, the data record 13 in $R_0,1$ is compared with the unity blank in $R_0,0$, so that the data record is displaced to the lower output line of sorting network $S_0,1$ to be deposited in $R_0,0$. The next input record 14 appearing on the upper input line of sorting network $S_0,2$ is compared with the unity blank, causing the data record 14 to be displaced to the lower output line of sorting network $S_0,2$ and placed into the register $R_0,1$. The unity blank appears at the upper output line of sorting network $S_0,2$, and is finally displaced out the unity blank output from logic circuit $A_3$.

In this manner, during each successive input interval, a new record from the list shown at the top of FIG. 7 is introduced to the system, and the records circulate in the system in the manner shown in the table of FIG. 7, until the end of the input mode, at which time the records are all stored in the random access memories in the manner shown for interval 16 at the bottom of the table.

It will be appreciated that during the input operation, the address register $AR_0$ addresses the memory cells 1 and 0 of the $R_0$ random access memory, so that during each input interval the recores and unity blanks in the two memory cells 1 and 0 are introduced to the respective input lines of the sorting network $S_0,1$. Also, during each successive input interval, the address register $AR_1$ first addresses the memory cells 0 and 2 of the random access memory $R_1$, and then addresses the memory cells 1 and 3, so that the contents of the pairs of memory cells are alternately presented to the input lines of the sorting network $S_1,1$ during each successive input interval in a cyclic manner. Likewise, the address register $AR_2$ during each successive input interval addresses the memory cells 0 and 4, 1 and 5, 2 and 6, 3 and 7 of the random access memory $R_2$ in a cyclic manner. Finally, during each successive input interval, the address register $AR_3$ addresses the memory cells 0 and 8, 1 and 9, 2 and 10, 3 and 11, 4 and 12, 5 and 13, 6 and 14, 7 and 15 of the random access memory $R_3$ in a cyclic manner.

Each record in the $R_0,1$ memory cell bears an address correponding to one of the pairs of cells, such as 0,2 in the memory register $R_1$; and the record in the memory cell $R_0,0$ bears the address of the other pair of memory cells, such as 1,3 in the memory register $R_1$. Likewise, the record in the memory cell $R_1,0$ bears the address of the first pair of memory cells 0,4 in the memory $R_2$; the record in the memory cell $R_1,1$ bears the address of the second pair of memory cells 1 and 5 of the memory $R_2$; the record in the memory cell $R_1,2$ bears the address of the third pair of memory cells 2,6 of memory $R_2$; and the record in the memory cell $R_1,3$ bears the address of the fourth pair of memory cells 3 and 7 of the memory $R_2$. In like manner, the record in the memory cell $R_2,0$ bears the address of the first pair of memory cells 0,8 in register $R_3$, the record in memory cell $R_2,1$ bears the address of the second pair of memory cells 1,9 of register $R_3$, and so on.

The logic circuits $A_0$, $A_1$, $A_2$ and $A_3$ assure that as the records are circulated through the system during the input mode, the address section of any record circulated out of any memory cell is removed from that record and given to the next record to be circulated into the same cell, so that the record in any particular memory cell has a fixed address corresponding to a pair of memory cells in the adjacent module representing the next sorting level.

During the output operation, unity blanks are fed into the upper input line of sorting network $S_0,2$ for each output interval, and unity blanks are also applied to the lower input line of sorting network $S_3,0$ for each output interval. Then, as each record is passed to the lower output line of each of the sorting networks $S_0,0$, $S_1,0$, $S_2,0$ and $S_3,0$, the record passes through a corresponding one of the logic circuits $B_0$, $B_1$, $B_2$ and $B_3$.

As a record appears on the lower output line of sorting network $S_0,0$, for example, during the output operation, its address portion from the logic circuit $B_0$ is placed in the $C_1$ address register. Then, at the appropriate time, the address is passed to the $AR_1$ register to select one of the two pairs of memory cells in the random access memory $R_1$, as designated by the address.

Likewise, as a record appears on the lower output line of the sorting network $S_1,0$, its address portion is placed by the logic circuit $B_1$ in the address register $C_2$, so that at the proper time, the address may be transferred to the address register $AR_2$, so as to select one of the four pairs of memory cells. In like manner, whenever a record appears at the lower output line of the sorting network $S_2,0$, its address is placed by the $B_2$ logic circuit in the $C_3$ register, and at the appropriate time is passed to the $AR_3$ register to select a particular pair of memory cells in the random access memory $R_3$. Under such a control, the output operation proceeds from interval-to-interval, in the manner shown in FIG. 8.

Figure 8:
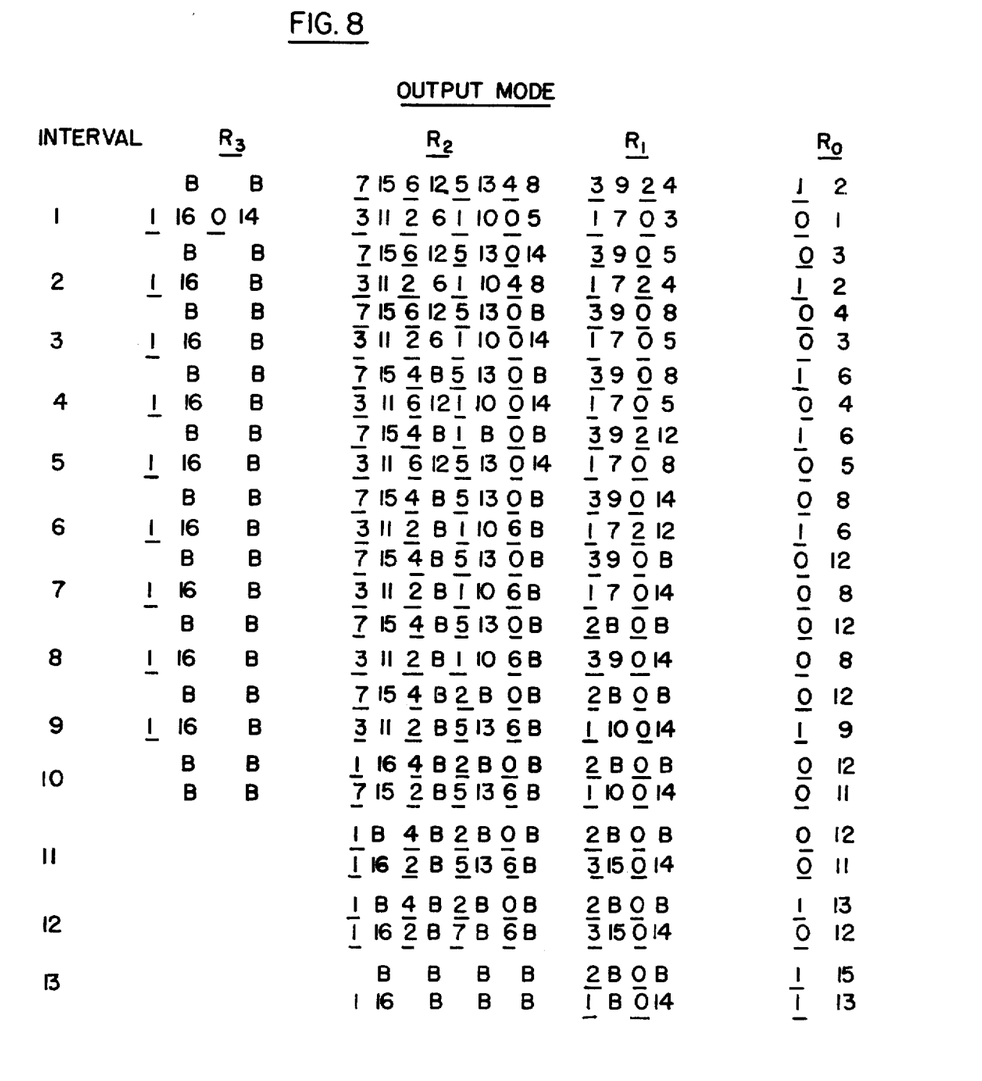
FIG. 8 is a table showing the manner in which data records are retrieved in a sorted sequence from the system of FIG. 6 during the output mode.

During the first output interval, for example, the number 1 record in the memory cell $R_0,0$ is transferred through sorting network $S_0,1$ to the upper input line of sorting network $S_0,0$, at the same time a unity blank is applied to the lower input line of the sorting network $S_0,0$, so that the number 1 record is displaced out of the system from the lower output line of sorting network $S_0,0$. During the second output interval, the number 2 record undergoes the same process and is displaced out the lower output line of sorting network $S_0,0$. During the third output interval, the number 3 record is displaced out of the system, during the fourth output interval the number 4 record is displaced out of the system, and during the fifth output interval the number 5 record is displaced out of the system, and during the sixth output interval the number 6 record is displaced out of the system.

During the seventh output interval, the number 7 record is in the memory cell $R_1,1$, and it is compared with the number 9 record which is in the memory cell $R_1,3$. This causes the number 7 record to appear at the lower output line of sorting network $S_1,1$, to be compared with the unity bit in the sorting network $S_1,0$. This causes the number 7 record to be displaced to the lower output line of the sorting network $S_1,0$, and to pass through the $B_1$ logic circuit to the lower input line of the sorting network $S_0,0$, so that the number 7 record is displaced out of the system.

In like manner, during each successive output interval, the records of the system are processed so that they appear in an ascending sorted sequence at the lower output line of the sorting network $S_0,0$. The output mode continues until all of the records have been outputted from the system in a sorted sequence.

The lack of uniformity in the size of the memory modules in the system of FIG. 6 presents a difficulty from the standpoint of standardization which, in turn, complicates manufacture, inventory, maintenance and nearly all other aspects of the system. In particular, it makes record placement somewhat complex. To circumvent this difficulty a single memory system may be employed consisting of modules of a uniform size.

For example, instead of placing the contiguous characters of a record in contiguous memory locations, the different characters may be placed in corresponding memory locations in different modules. The individual modules may now all have the same length. The sorting procedure is essentially the same as the procedure described above.

In the second embodiment, a record introduced into the system during the input mode would have its first character placed in a particular module if that character were greater than the characters in corresponding positions in the modules between the input line and that particular module. A character already stored in the particular module and found to be greater than the input character would be displaced to the next module.

The second character of the input record would then first pass to the next module for comparison with the second character of the record already stored therein. The first module at the end of the input mode will then contain the first characters of just one pair of records. The second module will similarly contain the second characters of just one pair of records, and if the second module can accept six characters, it will also contain two pairs of first characters.

Thus, if the first character of a record is placed in a module $M_i$, the second character will be placed in the module $(M_{i+1(mod\ n)},$ if there are n modules in the system. Records are displaced out of the system during the output mode in the same manner as in the previous embodiment, and the only difference between the two embodiments is the manner in which the records are stored in the system.

In describing an implementation of the second embodiment, a sorting system containing four modules will be considered. Each module will be assumed to include a pair of random access memory registers, each having a capacity to store three data characters and one address character. Considering only the lower register in each module, the storage format shown schematically in FIG. 9 will be achieved.

Figure 9:
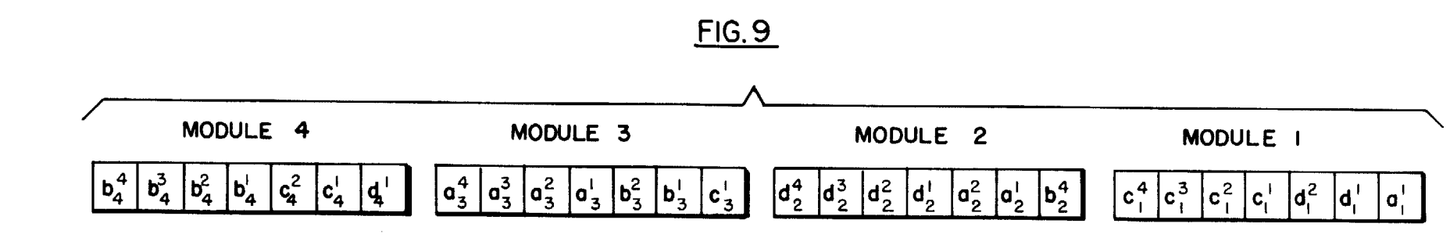
FIG. 9 is a schematic representation of a storage format in a second embodiment of the invention.

Each record will be assumed to have three characters a, b, c and an additional address character d. Character $a_1$ is the first character of a record in the first module; $a_2$ is the first character of a record in the second module, and so on. However, since the second module may contain two first characters, superscripts are used in FIG. 9. Then when seven characters have been placed in the four modules, the storage format will be as shown in FIG. 9.

To illustrate the concept of the second embodiment more clearly, it will be assumed that fourteen records of three characters each are to be sorted, the fourth character being reserved for the address required during the output mode. It will also be assumed that the fourteen records in the order of their appearance may be represented as follows:

| 1 | 2 | 3 | 4 | 5 | 6 | 7 |
|---|---|---|---|---|---|---|
| 341 | 356 | 987 | 235 | 528 | 476 | 875 |
| 8 | 9 | 10 | 11 | 12 | 13 | 14 |
| 736 | 492 | 137 | 685 | 312 | 413 | 673 |

Figure 10:
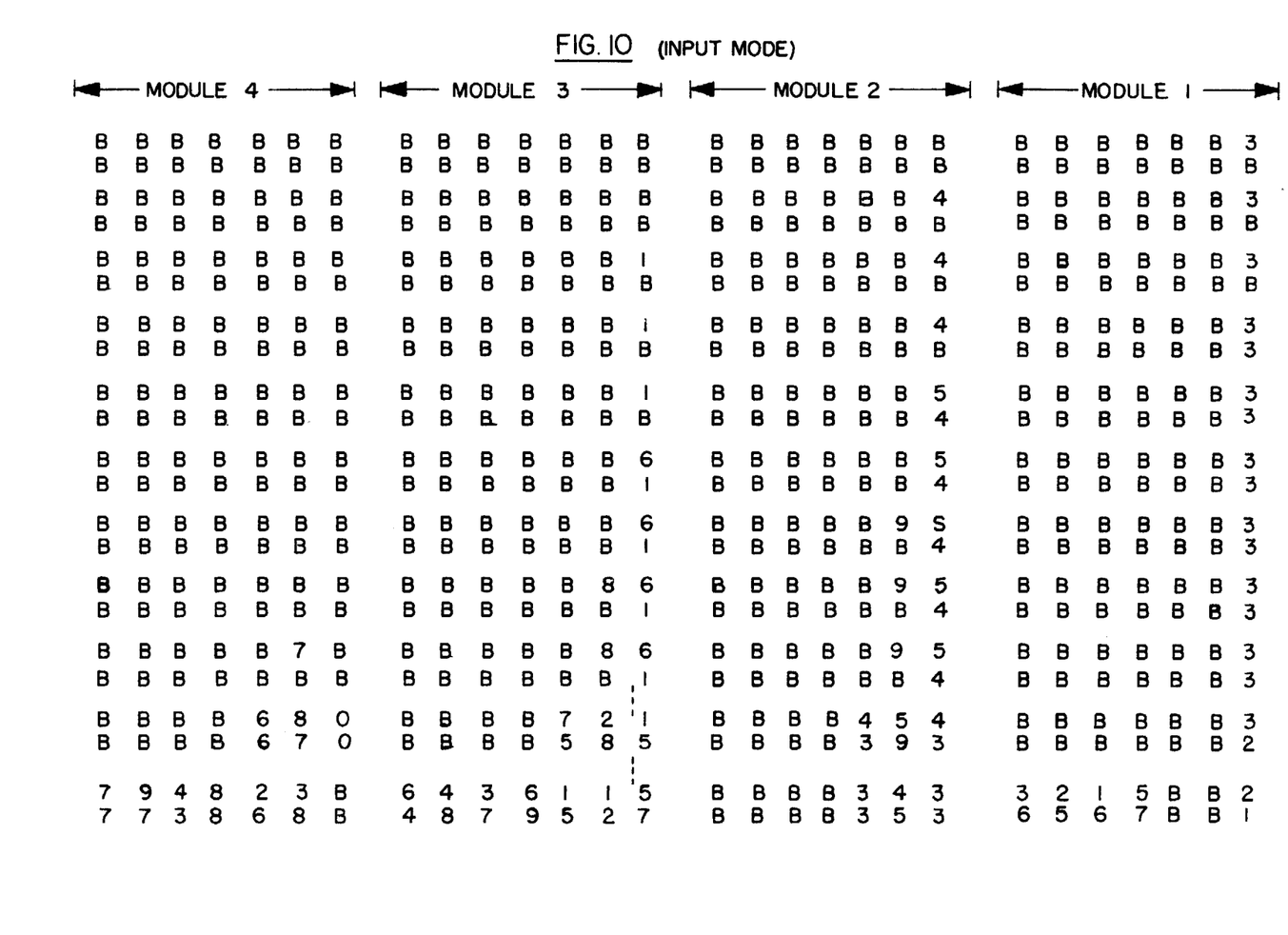
FIG. 10 is a table showing the manner in which data records are stored in the system of the second embodiment during an input mode.
Figure 11:
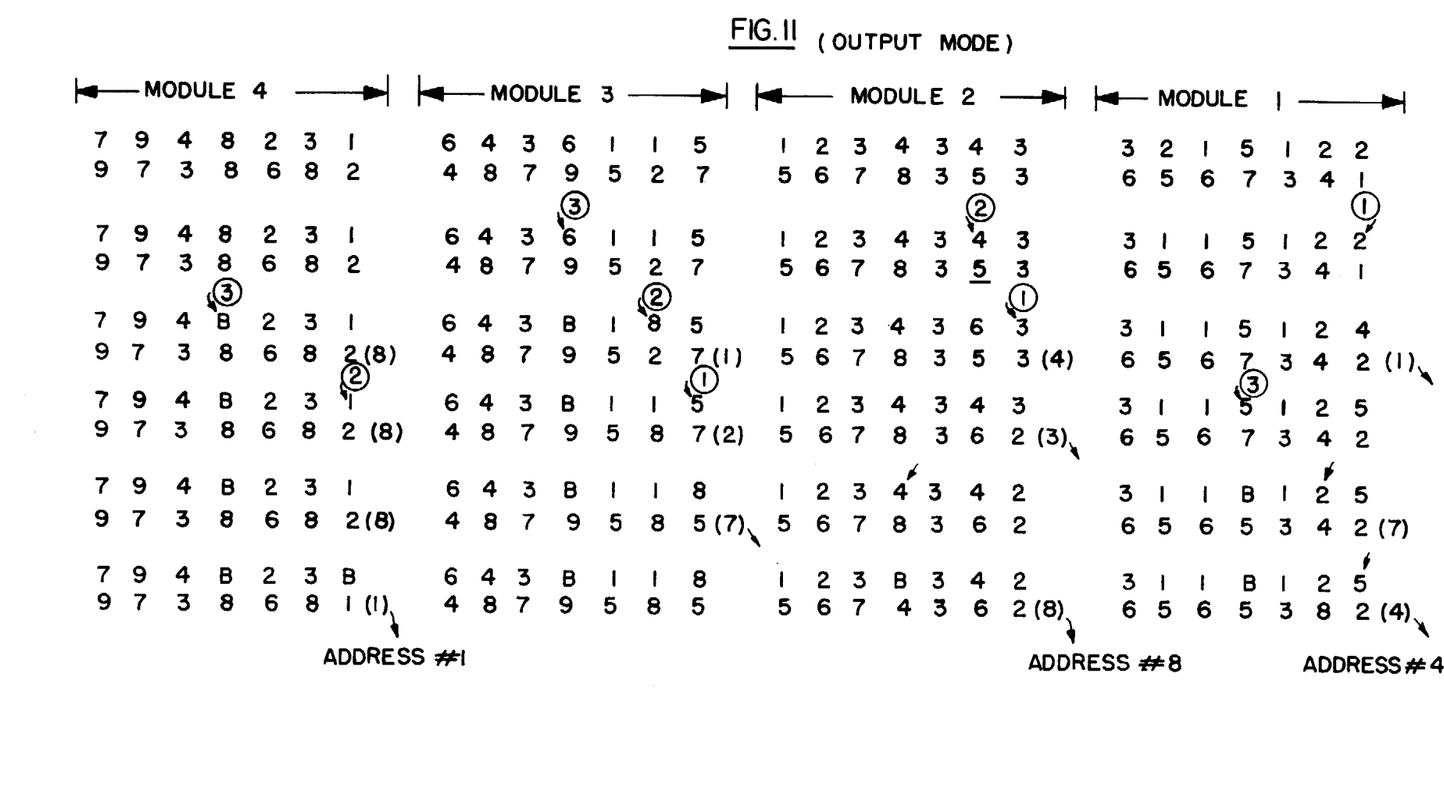
FIG. 11 is a table showing the manner in which data records are retrieved in a sorted sequence from the system of the second embodiment during an output mode.

The input mode will then proceed, as shown in FIG. 10; and the output mode will proceed as shown in FIG. 11.

At the beginning of the output mode, the first character of a blank record is introduced into module 3 for comparison with an appropriately selected first data record. The lower output of the sorting network to which the balnk character passes is then transmitted to a sorting network for comparison with the first character of a data record in module 2. Similarly, the lower output of the sorting network from module 2 will pass to a sorting network of module 1, and finally the first character of the data record will appear at the lower output of the sorting network of module 1.

The second character of the blank record is then introduced into the system, and it must be compared with the second character of the first data record. For this reason, a cyclic permutation of the modules is required so that the first comparison of the second characters may be carried out in module 4, and proceed to module 3, and finally to module 2.

It should be noted that the sorting network used for the comparison must contain information received from the first comparison made in module 3, and, if an exchange was made in module 3, the exchange state must be established in the corresponding sorting network in module 4 before the second character is introduced to that sorting network.

The system of the second embodiment, accordingly, must be modified slightly, as compared with the system of FIG. 6, so that the sorting networks may transmit their states from module to module. Also, the system of FIG. 6 must be changed slightly so that the register paris in the different modules may be properly addressed to accomplish the data placement of FIGS. 10 and 11.

With respect to the modificatons of the sorting networks, a typical sorting network $S_i$ will be considered. The outputs of $S_i$ are:

$$A = a\overline{E} + b\overline{I}$$
$$B = \overline{a\overline{I} + b\overline{E}}$$

But to set the states of the exchange and inhibit flip-flops, the conditions must be:

Set $E_{i+1 \bmod n} : \overline{a}\,b\,\overline{I} + t_c E_i$

Set $I_{i+1 \bmod n} : a\,\overline{b}\,\overline{E} + t_c I_i$

Where the term $t_c$ is a pulse received a specified time before the arrival of the characters a and b. The first sorting network to transmit its state will, of course, be the first sorting network to receive a data character in any data comparison cycle.

During the output mode, whenever the address character d of record, which is the last character, appears at the output of a module i; the character is transmitted to module i + 1 mod n, or i + 1 mod 4 in the example under consideration.

In the second embodiment, it is clearly feasible to gain simultaneous access to four characters of the same record. Thus, the quadruple $(a_3^4, b_4^4, c_1^4, d_2^4)$ could be compared all at once. More precisely, of course, $a_3^4$ would first be compared with the putative input record, followed by comparison of $b_4^4$, etc. When an inequality is found, the appropriate switch would be set, and otherwise the procedure would be essentially unchanged. This is significant because all of the modules may then be operated at once, with consequent increase in speed. It should be noted that if this procedure is used, there will be but one pair of flip-flops for all of the sort circuits in the various modules of the system.

While particular embodiments of the invention have been shown and described, modifications may be made, and it is intended in the appended claims to cover all the modifications which come within the spirit and scope of the invention.

What is claimed is:

1. A system for sorting a plurality of multi-bit binary records, each record being identified by a multi-bit key, and said records being sorted into an ascending or descending order with respect to the keys of successive records, said system including a plurality of modules intercoupled with one another to represent a plurality of sorting levels, any of said modules including: a pair of random access memories, each of said memories having a predetermined number of memory cells greater than one; address register means coupled to said pairs of random access memories for selectively designating pairs of the memory cells therein; first comparing network means having a first pair of inputs respectively coupled to said pair of random access memories for comparing pairs of records from said random access memories as selected by said address register means and having first and second outputs; second comparing network means having first and second outputs and having a first input connected to the first output of said first comparing network means and having a second input coupled to the first output of the second comparing network means of a first adjacent module, and said second comparing network means of said one of said modules having its second output coupled to one of the pair of random access memories of said one of said modules for introducing records to the memory cells therein designated by said address register means; third comparing network means having a first input connected to the second input of the first comparing network means and having a second input coupled to the second output of the third comparing network means of a second adjacent module, and said third comparing network means of said one of said modules having a first output coupled to the other of said pair of random access memories of said one of said modules for introducing records to the memory cells therein designated by said address register means.

2. The system defined in claim 1, in which said pairs of random access memories in successive ones of said modules each has an increasing number of memory cells in a progression $2^0, 2^1, 2^2, 2^3 \ldots$.

3. The system defined in claim 1, in which said pairs of random access memories in successive ones of said modules each has the same number of memory cells.

4. The system defined in claim 1, in which each record selected from a memory cell has a multi-bit address portion identifying that memory cell, and which includes a logic circuit interposed between the first output of said second comparing network and the second input of the second comparing network of the second adjacent module for removing said address portion from each record circulating therethrough and for introducing said address portion to the record circulating through the corresponding logic circuit in said first adjacent module.

5. The system defined in claim 1, in which each record selected from a memory cell has a multi-bit address portion identifying that memory cell, and which includes a logic circuit interposed between the second input of the third comparing network and the second output of the third comparing network of the second adjacent module, said logic circuit being responsive to the address portion of each record circulated therethrough for causing the address register of the second adjacent module to select a pair of records from the memory cells in the corresponding pair of random access memories in said second adjacent module as designated by said address portion.

6. The system defined in claim 1, in which each record selected from a memory cell has a multi-bit address portion identifying that memory cell, and which includes a first logic circuit interposed between the first output of said second comparing network and the second input of the second comparing network of said second adjacent module for removing said address portion from each record circulated therethrough and for introducing said address portion to the record circulating through the corresponding first logic circuit in said first adjacent module; and which includes a second logic circuit interposed between the second input of the third comparing network and the second output of the third comparing network of said second adjacent module, said second logic circuit being responsive to the address portion of each record circulated therethrough for causing the address register of said second adjacent module to select a pair of records from the memory cells in the corresponding pair of random access memories in said second adjacent module as indicated by said address portion.

7. The system defined in claim 1, in which data input is introduced to the second input of the second comparing network of the first of a succession of said modules.

8. The system defined in claim 6, in which output records are derived during an output mode from the second logic circuit coupled to the second output of the third comparing network of the first of a succession of said modules.

9. A system for sorting a plurality of multi-bit binary records, each identified by a multi-bit key, into an ascending or descending order with respect to the keys of said multi-bit binary records, said system including: a plurality of modules intercoupled to one another to represent a plurality of sorting levels, each of said modules including a pair of random access memories, and each of the memories having a predetermined number of memory cells greater than one; address register means coupled to said pair of random access memories for selectively designating pairs of the memory cells therein; and comparing network means coupled to said pair of random access memories for processing records from said memories as designated by said address register means.

10. The system defined in claim 9, in which said pairs of random access memories in successive ones of said modules have an increasing number of memory cells in a progression $2^0, 2^1, 2^2, 2^3 \ldots$ 11. The system defined in claim 9, in which each record selected from a memory cell in each of said pair of random access memories has a multi-bit address portion identifying that memory cell, and which includes a first logic circuit coupled to said comparing network means for removing the address portion from each record circulated therethrough and for introducing said address portion to the record circulating through the corresponding logic circuit in a first adjacent module.

12. The system defined in claim 9, in which each record selected from a memory cell has a multi-bit address portion identifying that memory cell, and which includes a second logic circuit coupled to said comparing network means and responsive to the address portion of each record circulated therethrough for causing the address register of an adjacent module to select a pair of records from the memory cells in the corresponding pair of random access memories in said adjacent module, as indicated by said address portion.

13. The system defined in claim 9, in which each record selected from a memory cell has a multi-bit address portion identifying that memory cell, and which includes a first logic circuit coupled to said comparing network means for removing said address portion from each record circulated therethrough and for introducing said address portion to a record circulating through the corresponding logic circuit in a first adjacent module, and which includes a second logic circuit coupled to said comparing network means and responsive to the address portion of each record circulated therethrough for causing the address register of a second adjacent module to select a pair of records from the memory cells in the corresponding pair of random access memories in said second adjacent module as indicated by said address portion.

14. A system capable of producing a sorted output sequence of multi-bit records in response to a randomly ordered sequence of such records introduced into the system, said system including: a plurality of circuit modules intercoupled to one another and representing a sequence of sorting means within the system, a first one of said circuit modules having the capacity to provide storage for one cluster of said records, and the remaining ones of said circuit modules having respective capacities to provide storage for predetermined different numbers of clusters of said records; input means for introducing a randomly ordered sequence of records into a first of said sorting means; means included in said first sorting means to store the records introduced thereto into a cluster in which the first record of such cluster is identified; rearranging circuit means interposed between each of said sorting means; means coupled to each of said sorting means for passing records from each of said sorting means to the next of said sorting means through said rearranging circuit means; and means included in all of said sorting means other than said first sorting means for forming a plurality of clusters of records in each of said sorting means in response to the records passed thereto by said passing means, each of said sorting means containing a record which precedes each record of a cluster of the next of said sorting means in the sorted output sequence of said records.

15. The system defined in claim 14, and which includes means connected to said sorting means and including comparing circuit means for successively selecting the first record of one of the clusters in each of said sorting means to produce the sorted output sequence of records.

16. The system defined in claim 14, and which includes means in each of said sorting means other than the last of said sorting means for creating for each record in each of said sorting means an identification of the cluster which it precedes in the sorted output sequence; and means for selecting a cluster of records from each of said sorting means in response to the identification of a record in an adjacent one of said sorting means.

17. The system defined in claim 16, and which includes first means connected to each of said sorting means for simultaneously selecting one cluster of records from each of said sorting means; second means connected to said first means for selecting the first record in each of the selected clusters of records; third means connected to said second means for passing such selected first record from each of said sorting means to the selected cluster of records in the next of said sorting means; fourth means connected to said second means and to said third means for comparing the first record from the selected cluster of records from each of said sorting means and the record passed from the next of said sorting means on one side thereof and for passing one of the two records from the next of said sorting means on the other side thereof, and for repeating such operations until finally the first record of the sorted output sequence is passed from the first of said sorting means; and means included in said comparing means for causing the next selection of the cluster of records to be made from the next sorting means rather than from a particular sorting means when the aforesaid identification is detected for a record introduced to said comparing means from a particular sorting means.

* * * * *